(12) United States Patent
Osogami

(10) Patent No.: US 9,196,010 B2
(45) Date of Patent: Nov. 24, 2015

(54) RESOURCE COST OPTIMIZATION SYSTEM, METHOD, AND PROGRAM

(75) Inventor: Takayuki Osogami, Yamato (JP)

(73) Assignee: International Business Machines Corporation, Armonk, NY (US)

(*) Notice: Subject to any disclaimer, the term of this patent is extended or adjusted under 35 U.S.C. 154(b) by 260 days.

(21) Appl. No.: 13/416,275

(22) Filed: Mar. 9, 2012

(65) Prior Publication Data

US 2012/0239453 A1 Sep. 20, 2012

(30) Foreign Application Priority Data

Mar. 18, 2011 (JP) .................. 2011-060037

(51) Int. Cl.
*H02J 1/00* (2006.01)
*H02J 11/00* (2006.01)
*G06Q 50/06* (2012.01)
*G06Q 30/02* (2012.01)
*G06Q 10/04* (2012.01)
*G06Q 10/06* (2012.01)

(52) U.S. Cl.
CPC ............ *G06Q 50/06* (2013.01); *G06Q 10/04* (2013.01); *G06Q 10/06* (2013.01); *G06Q 30/0283* (2013.01)

(58) Field of Classification Search
CPC .................................... H02J 1/00; H02J 11/00
USPC ........................................................ 705/7.25
See application file for complete search history.

(56) References Cited

U.S. PATENT DOCUMENTS

| | | | |
|---|---|---|---|
| 7,548,907 B2* | 6/2009 | Wall et al. ............................. 1/1 |
| 8,068,938 B2* | 11/2011 | Fujita ............................ 700/295 |
| 8,280,656 B2* | 10/2012 | Kreiss et al. ..................... 702/60 |
| 8,346,401 B2* | 1/2013 | Pollack et al. ................. 700/291 |
| 2006/0064037 A1* | 3/2006 | Shalon et al. .................. 600/586 |
| 2009/0292402 A1 | 11/2009 | Cruickshank, III |

(Continued)

FOREIGN PATENT DOCUMENTS

| JP | 2001-321810 A | 11/2001 |
|---|---|---|
| JP | 2002-209335 A | 7/2002 |
| JP | 2002247761 A | 8/2002 |

(Continued)

OTHER PUBLICATIONS

Zhang et al., "Factored Markov Decision Process Models for Stochastic Unit Commitment", Mitsubishi Electric Research laboratories, Technical Report TR2010-083, 2010.*

(Continued)

*Primary Examiner* — Thomas L Mansfield, Jr.
(74) *Attorney, Agent, or Firm* — Cantor Colburn LLP

(57) ABSTRACT

Apparatus and method use a Markov decision process (MDP) to reduce the cost of variations in electric power usage. The user notifies a power company of a predicted value for a period. The period is divided into subsections. For each subsection, on the basis of a MDP including a state that depends on an electric power usage amount error, charge amount, and set target, the amount of charging and discharging of a storage battery as an action at any given time is optimally decided depending on the electric power usage amount error, charge amount, time, and set target at that time. A predetermined time in a subsection is a target setting time, at which a future target is further set as the action. The action includes deciding the charging and discharging amount in that subsection and deciding a future target in a subsection whose target should be set.

10 Claims, 14 Drawing Sheets

(56) References Cited

U.S. PATENT DOCUMENTS

| | | | |
|---|---|---|---|
| 2010/0179704 A1* | 7/2010 | Ozog | 700/291 |
| 2011/0215903 A1* | 9/2011 | Yang et al. | 340/8.1 |

FOREIGN PATENT DOCUMENTS

| | | |
|---|---|---|
| JP | 2003-189477 A | 7/2003 |
| JP | 2006109621 A | 4/2006 |
| JP | 2007-229944 A | 9/2007 |
| JP | 200867469 A | 3/2008 |
| JP | 2010-268602 A | 11/2010 |

OTHER PUBLICATIONS

Cheung et al., "Markov Decision Process (MDP) Framework for Optimizing Software on Mobile Phones", EMSOFT '09 Proceedings of the seventh ACM International Conference on Embedded Software, pp. 11-20, 2009.*

Qui et al., "Dynamic Power Management based on Continuous-Time Markov Decision Processes", Department of Electrical Engineering-Systems, University of Southern California, Los Angeles, California, 1999.*

Goez et al., "Stochastic Unit Commitment Problem," IBM Research Report RC24713 (W0812-119), Dec. 23, 2008.

Nikovski et al., "Factored Markov Decision Process Models for Stochastic Unit Commitment," Technical Report TR2010-083, Mitsubishi Electric Research Laboratories, Inc., Oct. 2010.

Sundstom et al., "Optimization Methods to Plan the Charging of Electric Vehicle Fleets," Proc. of Int. Conf. on CCPE 2010, pp. 323-328.

* cited by examiner

RESOURCE COST OPTIMIZATION SYSTEM, METHOD, AND PROGRAM

CROSS REFERENCE TO RELATED APPLICATION

This application claims priority under 35 U.S.C. §119 from Japanese Patent Application No. 2011-060037 filed Mar. 18, 2011, the entire contents of which are incorporated herein by reference.

FIELD OF THE INVENTION

The present invention relates to a technique for adjusting a cost by computer control under conditions where usage rates are imposed in a predetermined cost scheme in using a resource, such as electric power, gas, or water.

BACKGROUND

The present invention is not limited to electric power, but is described below using electric power as an example. For an electric power company, demand forecasting for the amount of electric power consumption is useful because the cost can be saved by adjustment of the utilization rate of an electric generator set. Thus, typically, usage rates are set such that they are relatively low if an electric power consumed by a facility that consumes an enormous amount of electric power, such as a steel mill, does not exceed an estimate which the facility will have notified the electric power company in advance.

One example of a typical scenario of a steel mill in this case is to set an electric power usage every 30 minutes, to notify an electric power company of that electric power usage, and to decide an electric power usage in the ensuing 30 minutes before 15 minutes elapse. FIG. 1 schematically illustrates the progression of an estimate of an electric power demand in a steel mill and an actual amount of electric power consumption over time. In FIG. 1, a stepped line 102 indicates an electric power demand notified (communicated) to an electric power company, and a curve 104 indicates an actual electric power consumption.

As illustrated in FIG. 1, when the actual electric power consumption 104 exceeds the electric power demand 102 notified to the electric power company, a comparatively high additional fee is imposed according to the excess amount of electric power indicated by the oblique line (called electricity buying). In contrast, when the actual electric power consumption 104 falls below the electric power usage notified, the difference in the electric power usage is unused and thus may preferably be minimized. Accordingly, a system for performing such control using computer processing is desired. Examples of techniques of electric power control disclosed in patent literatures are described below.

Japanese Unexamined Patent Application Publication No. 2002-209335 discloses a customer electric power consumption control and management system that aims to appropriately reduce an electric power consumption in an office building by an energy center managing it over a network. The disclosed system communicates with a building automation system (BAS) in each building, collects measurement data on electric power consumption in each office building from the BAS, predicts the total demand of electric power in the buildings on the basis of total demand prediction ancillary information that contains an electric power consumption history pattern in each office building calculated from the measurement data on electric power consumption in each office building from the past to the present, the measurement data on the electric power consumption in each office building, a weather including temperature and humidity, and information on events in the office buildings, and provides an instruction to the BAS over a network such that the electric power consumption in each office building is controlled on the basis of the predicated total demand of electric power.

Japanese Unexamined Patent Application Publication No. 2003-189477 discloses a power controller that aims to efficiently utilize electric power using a solar cell and a storage battery and also achieve a reduced cost of purchase of electric power. The power controller includes an electric power load indicated so as to include an air-conditioning device, the electric power load being connected to a commercial AC power source line connected to a commercial AC power source, a solar cell connected thereto through an inverter and a DC-to-DC converter in this order, a storage battery connected thereto through a bidirectional inverter and a bidirectional DC-to-DC converter in this order, and a control unit that controls the directivity of the bidirectional inverter.

Japanese Unexamined Patent Application Publication No. 2006-50730 discloses a method and apparatus for creating an operation plan that meets system reliability and operation restrictions of a power generator and that aims to achieve an optimal supply capability of a thermal power plant, a pumped storage power plant, a hydroelectric power plant, an interchange power, and the like. By the method and apparatus, an operation plan that meets all of the constraints is created by relaxation of a start-stop state of a thermal power plant to a real number variable and addition of a restriction of temporal change in the start-stop state, and on the basis of this operation plan, an optimal operation plan is created by establishing the start-stop state of the real number in the start state or the stop state by setting an evaluation function or conducting a local search.

Japanese Unexamined Patent Application Publication No. 2010-268602 discloses a method and apparatus for providing options on electricity tariffs, charging time periods, charging times, or electricity selling in charging and discharging a storage battery. In the disclosed apparatus, a display and input unit receives an input of a constraint for charging and discharging, a system power buying/selling tariff storage unit acquires information on fees of selling electricity and buying electricity, a storage battery charging and discharging control/storage battery status detection unit acquires information on a storage battery, an optimal schedule computation unit generates a schedule that satisfies the constraint on the basis of the constraint, fee information, and storage-battery information, and a charging and discharging control unit charges and discharges the storage battery on the basis of the schedule generated by the optimal schedule computation unit.

Examples of non-patent literatures of the related techniques are described below.

The paper of O. Sundstöm and C. Binding, "Optimization Methods to Plan the Charging of Electric Vehicle Fleets," Proc. CCPE 2010, pp. 323-328 describes optimization of a charging and discharging plan using mixed integer programming. This technique optimizes a predicted value of an electric power demand as an established value.

The report of J. Goez, J. Luedtke, D. Rajan, and J. Kalagnanam, "Stochastic Unit Commitment Problem," IBM Research Report, RC24713, 2008 describes optimization of an electric power generation using mixed integer plan. This technique predicts an electric power demand as a plurality of scenarios and assigns a probability to each scenario. However, it is difficult for this technique to deal with many scenarios in terms of computational complexity and to optimize a plan for a long period of time in terms of computational complexity.

The report of D. Nikovski and W. Zhang, "Factored Markov Decision Process Models for Stochastic Unit Commitment," Technical Report TR2010-083, MITSUBISHI ELECTRIC RESEARCH LABORATORIES, 2010 describes an example that uses the Markov decision process in an electric power generation plan. This example uses the Markov decision process and also uses a result of demand forecasting and deals with optimization of a finite time period.

CITATION LIST

[Patent Literature 1] Japanese Unexamined Patent Application Publication No. 2002-209335
[Patent Literature 2] Japanese Unexamined Patent Application Publication No. 2003-189477
[Patent Literature 3] Japanese Unexamined Patent Application Publication No. 2006-50730
[Patent Literature 4] Japanese Unexamined Patent Application Publication No. 2010-268602
[Non-patent Literature 1] O. Sundström and C. Binding, "Optimization Methods to Plan the Charging of Electric Vehicle Fleets," Proc. CCPE 2010, pp. 323-328
[Non-patent Literature 2] J. Goez, J. Luedtke, D. Rajan, and J. Kalagnanam, "Stochastic Unit Commitment Problem," IBM Research Report, RC24713, 2008
[Non-patent Literature 3] D. Nikovski and W. Zhang, "Factored Markov Decision Process Models for Stochastic Unit Commitment," Technical Report TR2010-083, MITSUBISHI ELECTRIC RESEARCH LABORATORIES, 2010

It is an object of the present invention to provide a technique for reducing a cost of variations in the amount of usage of a resource by the use of storing and releasing the resource on the basis of a Markov decision process ("MDP").

SUMMARY OF THE INVENTION

The disclosed subject matter concerns a computer implemented method for generating a policy for optimizing a cost of a resource under a predetermined cost structure. According to various aspects disclosed herein, the method comprises several steps. The method involves preparing an error distribution that indicates a deviation of an amount of usage from a predicted value, a characteristic of a storing means for storing or releasing the resource, and the cost structure in a computer-readable form. It further includes calculating an expected cost in a Markov decision process and a parameter that includes a transition probability on the basis of the error distribution, the characteristic of the storing means, and the cost structure, the Markov decision process including a state that includes a usage amount error, an amount of charge (or resource) in the storing means, a specification of a section, and a set target. Additionally, the method includes deciding an optimal policy that includes an action of storing or releasing the resource of the storing means for the state using the expected cost in the Markov decision process and the parameter including the transition probability.

Another aspect of the disclosed subject matter concerns a computer executed program product for generating a policy for optimizing a cost of a resource under a predetermined cost structure. The program product causes the computer to execute several steps, including preparing an error distribution that indicates a deviation of an amount of usage from a predicted value, a characteristic of a storing means for storing or releasing the resource, and the cost structure in a computer-readable form. Another step is calculating an expected cost in a Markov decision process and a parameter that includes a transition probability on the basis of the error distribution, the characteristic of the storing means, and the cost structure, the Markov decision process including a state that includes a usage amount error, an amount of charge (or resource) in the storing means, a specification of a section, and a set target. An additional step is deciding an optimal policy that includes an action of storing or releasing the resource of the storing means for the state using the expected cost in the Markov decision process and the parameter including the transition probability.

The present invention in another one of its aspects is directed to a computer-implemented method for optimizing a cost of a resource under a predetermined cost structure, where the method includes retaining a policy generated by a method of claim 1 in a computer-readable manner on the basis of the cost structure. It also includes deciding an action of storing or releasing of storing means by calculating a Markov decision process that includes a state including a usage amount error, an amount of charge (or resource) in the storing means, a specification of a section, and a set target on the basis of the policy for each of a plurality of subsections into which the section is divided. Further, the method includes deciding an objective resource usage amount in a next section on the basis of the policy in a specific subsection of the plurality of subsections.

The present invention in another one of its aspects concerns a computer executed program product for optimizing a cost of a resource under a predetermined cost structure, where the program product causes the computer to execute a step of retaining a policy generated by a program product as described two paragraphs above in a computer-readable manner on the basis of the cost structure. The computer also decides an action of storing or releasing of storing means by calculating a Markov decision process that includes a state including a usage amount error, an amount of charge (or resource) in the storing means, a specification of a section, and a set target on the basis of the policy for each of a plurality of subsections into which the section is divided. In addition, the method decides upon an objective resource usage amount in a next section on the basis of the policy in a specific subsection of the plurality of subsections.

An apparatus according to other aspects of the invention may comprise a computer-implemented system for optimizing a cost of a resource under a predetermined cost structure, where the system includes a memory means, a storing means for storing or releasing the resource, and a means for retaining a policy generated using a program product as described above in the memory means in a computer-readable manner on the basis of the cost structure. The apparatus further includes a means for deciding an action of storing or releasing of storing means by calculating a Markov decision process that includes a state including a usage amount error, an amount of charge (resource) in the storing means, a specification of a section, and a set target on the basis of the policy for each of a plurality of subsections into which the section is divided. The apparatus also includes means for deciding an objective resource usage amount in a next section on the basis of the policy in a specific subsection of the plurality of subsections.

BRIEF DESCRIPTION OF DRAWINGS

In describing the various drawings, reference is made to accompanying drawings wherein like reference numerals designate like parts or steps and wherein.

DESCRIPTION OF PREFERRED EMBODIMENTS

Figure 1:
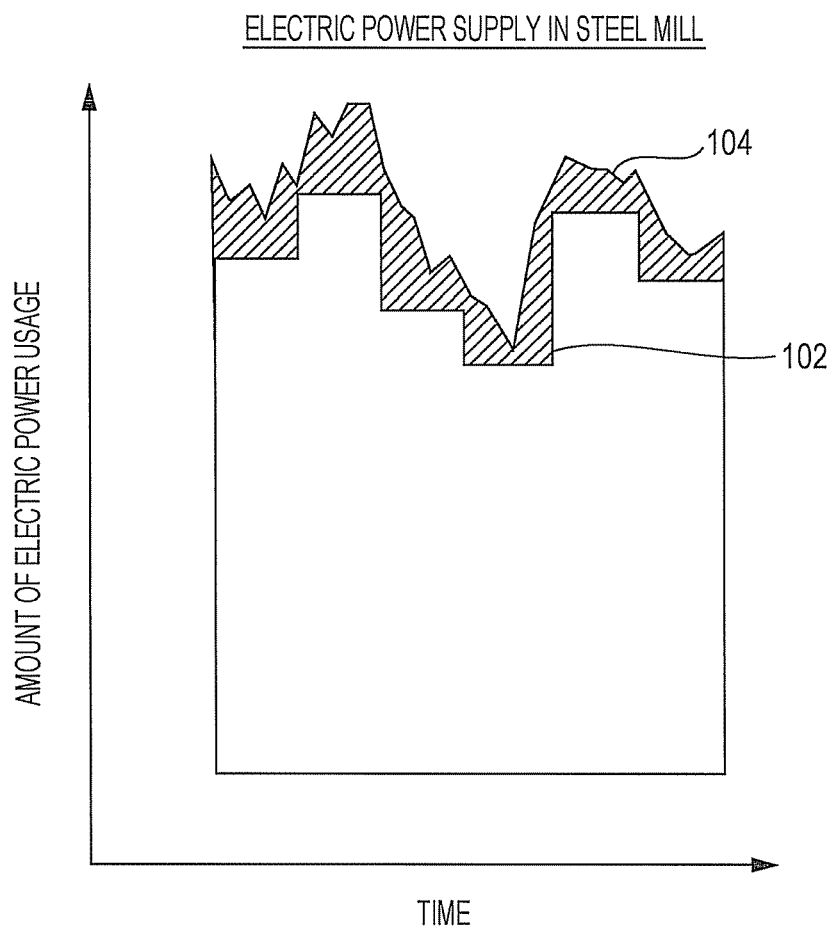
FIG. 1 illustrates an example of supply and demand of electric power in a steel mill.

Embodiments of the present invention will be described below with reference to the drawings. The same reference numerals indicate the same objects throughout the drawings unless otherwise specified. It is to be understood that embodiments described below are merely exemplary and are not intended to limit the invention to the content described in the embodiments. The embodiments below describe the case where electric power is the resource under consideration. It is to be understood that a resource is not limited to electric power, and the embodiments are also applicable to any resource, such as water or gas, as long as it can be temporarily stored and released and has a predetermined cost structure.

For the sake of convenience of description, when the case where an electric power is used is described, an embodiment of the present invention decides a policy on the basis of the Markov decision process using a prediction error distribution of electric power, a storage battery characteristic, and an electric power cost structure as an input.

A period to which a predicted value notified to an electric power company is applied may preferably be evenly divided subsections, and for each subsection, on the basis of a Markov decision process including a state that depends on an electric power usage amount error, charge amount, and set charging and discharging amount target (hereinafter, a charging and discharging amount target is abbreviated as a target), the amount of charging and discharging of a storage battery as an action at any given time is optimally decided depending on the electric power usage amount error, charge amount, time, and set target at that time. A predetermined time in a subsection is a target set time. In that time, as a further action, a future target is set. In describing preferred embodiments, a target (in a certain section)=The amount of electric power use (in that section) notified to a power plant minus a predicted value of electric power usage (in that section).

A "state" includes information on a decided future target. A state includes information indicating where it is in a subsection of T subsections (1, 2, . . . , T) and further includes information on an electric power usage amount error defined below.

An electric power usage amount error (in a subsection t)=An actual value of the amount of electric power usage (up to the subsection t)−A target (in that section)−(t/T)×A predicted value of electric power usage (in that section)

An action may include deciding the charging and discharging amount in that subsection and may also include deciding a future target in a subsection whose target should be set.

As a result, under an electric power cost structure in which an electric power that exceeds a predicted electric power usage amount is comparatively expensive, the power cost can be reduced using the charging and discharging amount of a storage battery decided as an action in the Markov decision process.

Figure 2:
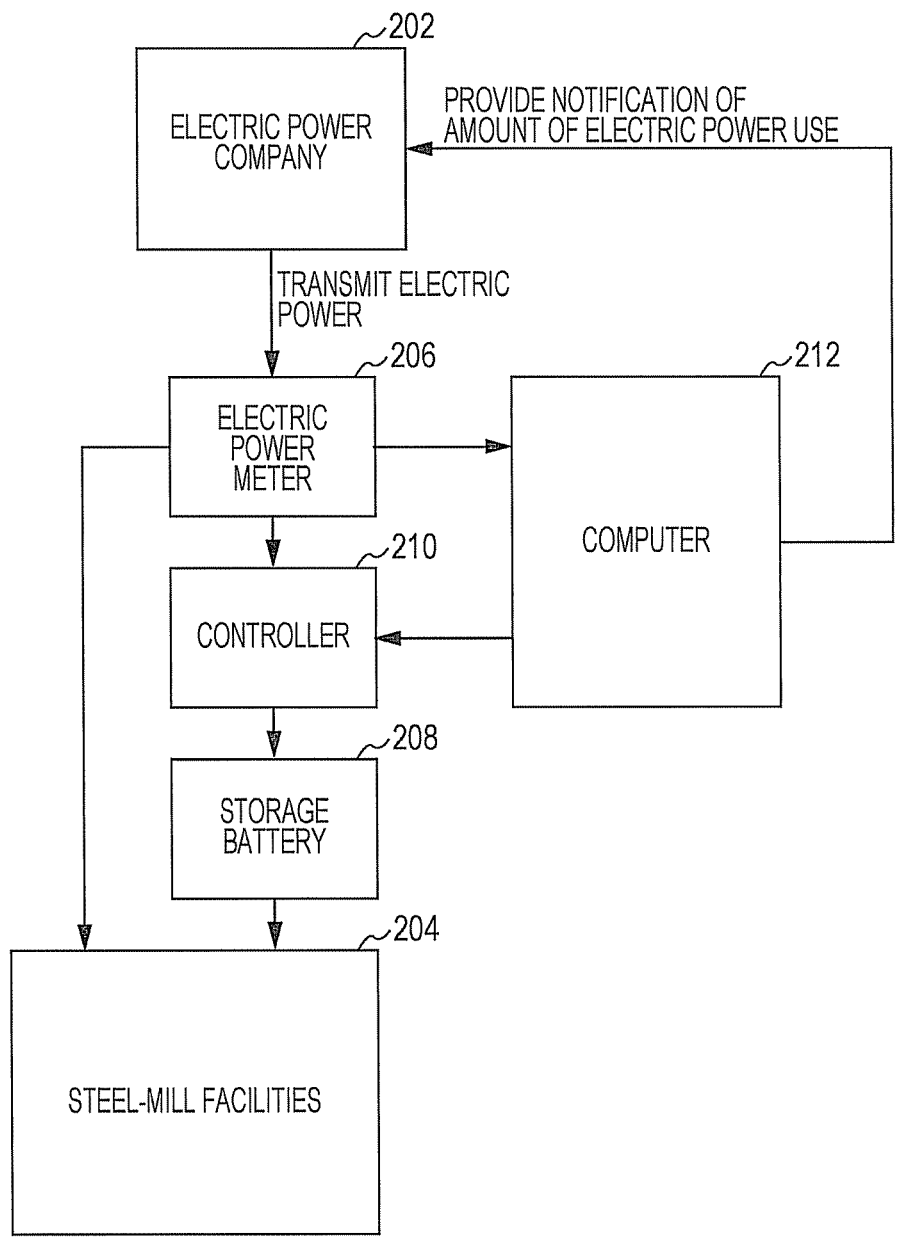
FIG. 2 is a diagram that illustrates one example of a configuration according to the present invention.

FIG. 2 generally illustrates facilities and devices for carrying out the present invention. As illustrated in FIG. 2, an electric power company (power plant) 202 transmits electric power to steel-mill facilities 204. The electric power transmitted from the electric power company 202 to the steel-mill facilities 204 is measured by an electric power meter 206.

The electric power transmitted is also input into a controller 210 for a storage battery 208. Accordingly, the electric power meter 206 measures the total amount of the electric power supplied to the steel-mill facilities 204 and that supplied to the controller 210.

A computer 212 is for performing a control operation. It receives the value of the measured amount of the electric power from the electric power meter 206 and transmits a signal to the controller 210 for controlling charging and discharging of the storage battery 208. That is, the storage battery 208 stores electric power transmitted from the electric power company 202 in a charging mode set by the controller 210 and supplies the electric power stored in the storage battery 208 to the steel-mill facilities 204 in a discharging mode set by the controller 210.

Here, the storage battery 208 is suited for large-scale electric power storage and may preferably be, but is not limited to, a sodium-sulfur battery or a lead-acid battery.

The computer 212 further has the function of notifying the electric power company 202 of the amount of electric power use decided on the basis of a predicted value of the amount of electric power use in the steel mill and a planned charging and discharging amount. A technique in a traditional known realm may also be used in prediction of the amount of electric power use in the steel mill according to a predetermined schedule. For example, techniques described in Japanese Unexamined Patent Application Publication No. 64-15201, No. 6-262223, and No. 2001-321810 may be used.

Figure 3:
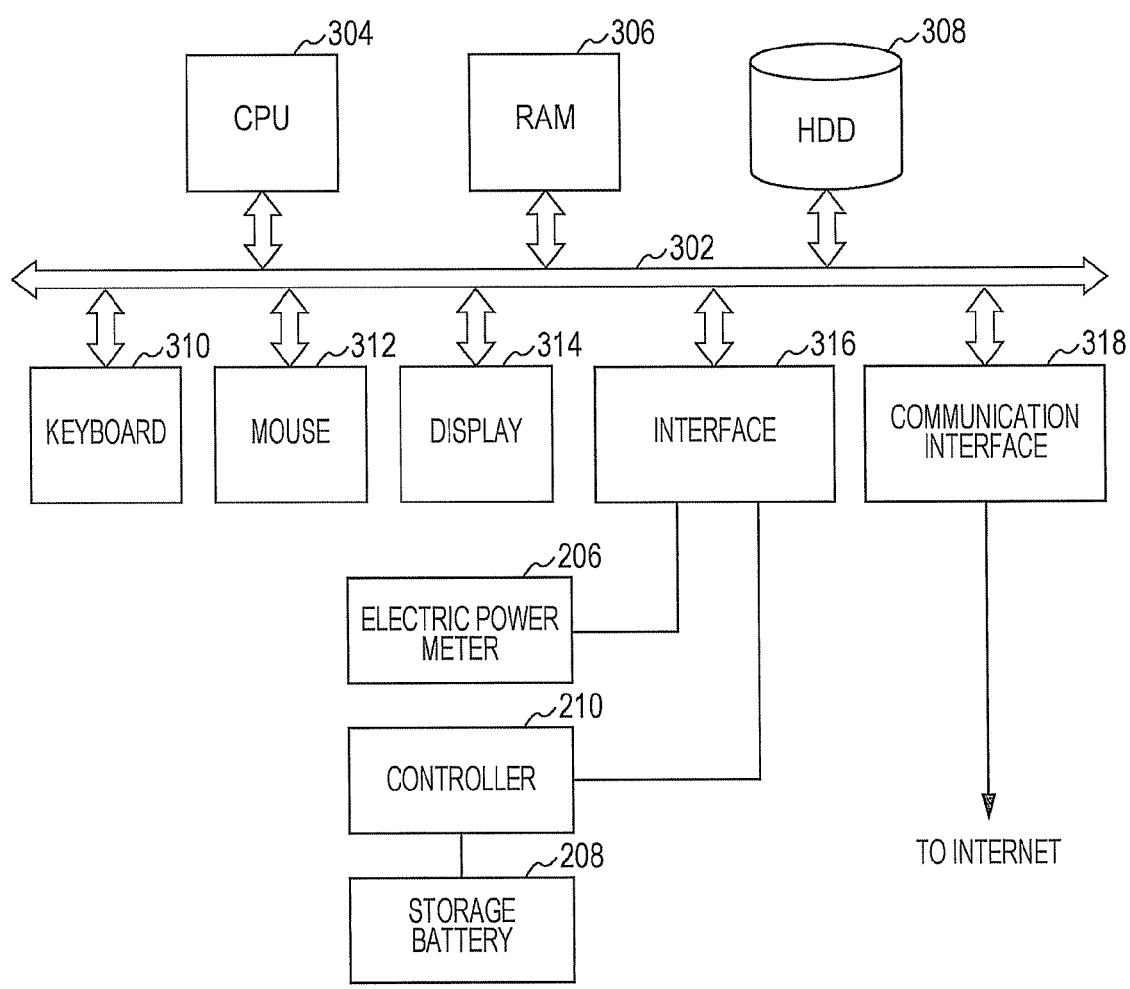
FIG. 3 is a block diagram of a hardware configuration of a computer in the configuration according to the present invention.

FIG. 3 is a block diagram, part of which illustrates a further detailed configuration of the computer 212. Any type of computer, such as a personal computer or work station, may be used as the computer 212. Here, an example in which a personal computer is used is described. In FIG. 3, a central processing unit (CPU) 304, a main memory (random-access memory (RAM)) 306, a hard disk drive (HDD) 308, a keyboard 310, a mouse 312, and a display 314 are connected to a system bus 302. The CPU 304 may preferably be based on a 32-bit or 64-bit architecture. Examples of the CPU 304 include Pentium (trademark) 4 from Intel Corporation, Core (trademark) 2 Duo from Intel Corporation, and Athlon (trademark) from Advanced Micro Devices, Inc. The main memory 306 may preferably have a capacity of 2 GB or more and more preferably have a capacity of 4 GB or more. The hard disk drive 308 may preferably have a capacity of 500 GB or more.

The HDD 308 stores in advance an operating system and a processing program which are not individually illustrated in FIG. 3. The processing program according to the present invention is described below with reference to FIG. 4. The operating system is any system suited to the CPU 304, and examples thereof include Linux (trademark), Windows Vista, Windows XP (trademark), and Windows (trademark) 7 from Microsoft Corporation, and Mac OS (trademark) from Apple computer.

The keyboard 310 and the mouse 312 are used to operate a graphic object, such as an icon, a task bar, and a window, displayed on the display 314 in accordance with a graphical user interface provided by the operating system. The keyboard 310 and the mouse 312 are also used to perform an operation of starting optimal policy generating processing or optimal policy executing processing, which are described below.

The display 314 may preferably be, but is not limited to, a 32-bit true color liquid crystal display (LCD) monitor that has a resolution of 1024×768 or more. The display 314 is used to display the progression of the amount of electric power consumption or other information using numbers, graphs, and other elements.

The system bus 302 is further connected to an interface card 316 and a communication interface card 318. The interface card 316 is based on an existing interface, such as peripheral component interconnect (PCI) or universal serial bus (USB) and is connected to the electric power meter 206 and the controller 210 for the storage battery 208 illustrated in FIG. 2. The details are described below. Briefly, the computer 212 acquires a value of the amount of electric power consumed in a specified period from the electric power meter 206 through the interface card 316 and transmits a control signal to the controller 210 through the interface card 316 to control charging and discharging of the storage battery 208.

The communication interface card 318 is a card that operates in accordance with the Ethernet® protocol, is connected to a proxy server (not illustrated) in an intranet in the steel mill, and is connected to the external Internet. As illustrated in FIG. 2, the communication interface card 318 is used to notify the electric power company of a predicted amount of electric power by the computer 212.

Figure 4:
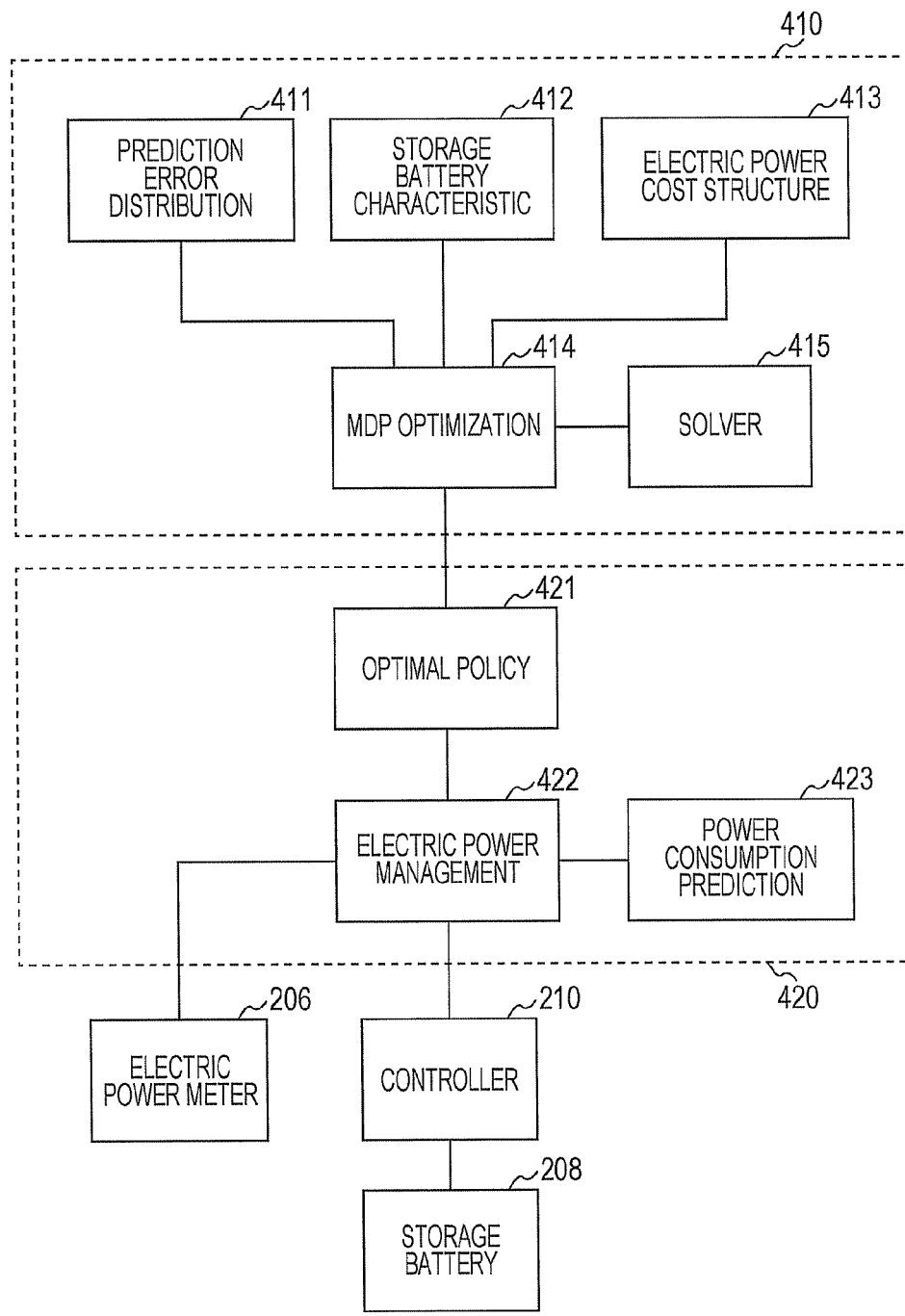
FIG. 4 is a block diagram of a functional configuration in the configuration according to the present invention.

Next, a functional configuration of the processing in an illustrative embodiment is described with reference to the functional block diagram in FIG. 4. As illustrated in FIG. 4, the functional configuration includes an optimal policy generating module 410 and an optimal policy executing module 420.

Modules 410 and 420 are described by any existing suitable programming language, such as C, C++, or Java®. A compiled executable binary file is retained in the hard disk drive 308, and it is loaded to the main memory 306 by the working of the operating system in response to an operation on the keyboard 310 or the mouse 312 and executed.

Preferably, Module 410 has three kinds of information, namely a prediction error distribution 411, a storage battery characteristic 412, and an electric power cost structure 413. The prediction error distribution 411 is statistical information generated on the basis of the time series of values of errors between a past predicted electric power (consumption) and an actual electric power (consumption). Preferably the storage battery characteristic 412 is characteristic information on a charging current characteristic, a charging voltage characteristic, a charging time characteristic, a discharging current characteristic, a discharging terminal voltage characteristic, and a discharging time characteristic of a storage battery. The storage battery characteristic 412 includes information on specifications provided by the maker of the storage battery, described in a computer-readable form. Preferably the electric power cost structure 413 includes information on a power tariff between an electric power company and an organization to which an electric power is supplied (in this case, a steel mill), described in a computer-readable form. The information on each of the prediction error distribution 411, the storage battery characteristic 412, and the electric power cost structure 413 is retained as a data file in a predetermined form in the hard disk drive 308.

The optimal policy generating module 410 further has, as a processing routine, a Markov decision process (MDP) optimization routine 414 and a solver 415. The MDP optimization routine 414 reads information on the prediction error distribution 411, the storage battery characteristic 412, and the electric power cost structure 413 and calculates a value of, for example, an expected cost and a transition probability. The MDP optimization routine 414 also calculates information on an optimal policy 421 using the solver 415 and employing the information on the expected cost and the transition probability and retains it in a computer-readable form in the hard disk drive 308. The details of the functions of the solver 415 are described below.

The optimal policy executing module 420 includes an electric power managing routine 422 that manages electric power on the basis of the information on the optimal policy 421 generated by the optimal policy generating module 410. In executing the optimal policy 421, the electric power management routine 422 transmits a control signal to the controller 210 using information on the electric power consumed acquired from the electric power meter 206 to charge or discharge the storage battery 208. A consumed electric power prediction routine 423 calculates a predicted amount of electric power consumed in accordance with a predetermined schedule in the steel-mill facilities 204. The calculation of the predicted amount of electric power consumed itself is known, as described in literatures such as Japanese Unexamined Patent Application Publication No. 64-15201, No. 6-262223, and No. 2001-321810, and it is not described here. The electric power management routine 422 notifies the electric power company 202 of the sum of the predicted amount of electric power consumed calculated by the consumed electric power prediction routine 423 and a correction term calculated in accordance with the optimal policy 421 by the electric power managing routine 422 as the predicted amount of electric power use in a certain section.

Figure 5:
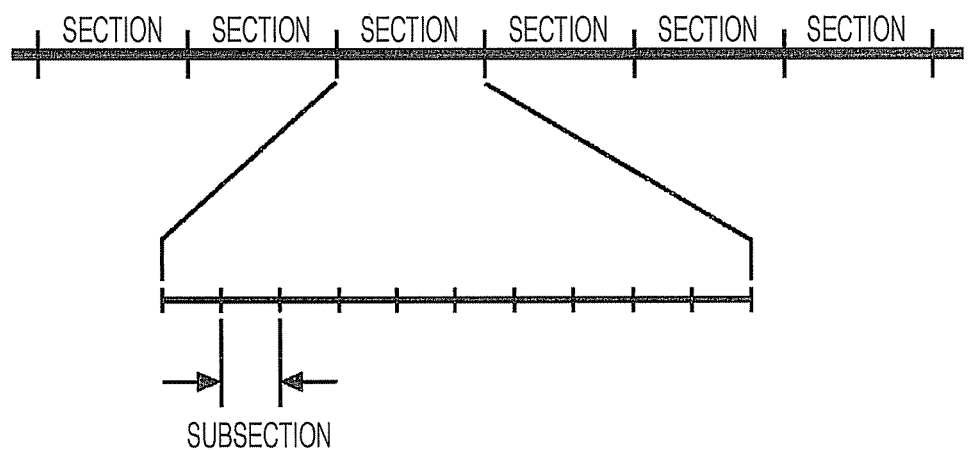
FIG. 5 illustrates a relationship between a section and a subsection.

Next, the functions of the optimal policy generating module 410 are described in detail below. Preferably an electric power is adjusted for each constant section, as illustrated in FIG. 5, and each section is made up of subsections having a uniform length.

The present invention uses "target" defined below in an application specified below.

Definition: A target (in a certain section)=The amount of electric power use (in that section) notified to a power plant–a predicted value of electric power usage (in that section).

Application: Finding an optimal policy in the MDP having the following characteristic.

A state includes information on a decided future target. A state includes information indicating where it is located in a subsection of T subsections (1, 2, ..., T) and further includes information on an electric power usage amount error defined below.

An electric power usage amount error (in a subsection t)=an actual value of the amount of electric power usage (up to the subsection t)−a target (in that section)−(t/T)×a predicted value of electric power usage (in that section)

An action includes deciding the charging and discharging amount in that subsection and includes deciding a future target in a subsection whose target should be set.

Figure 6:
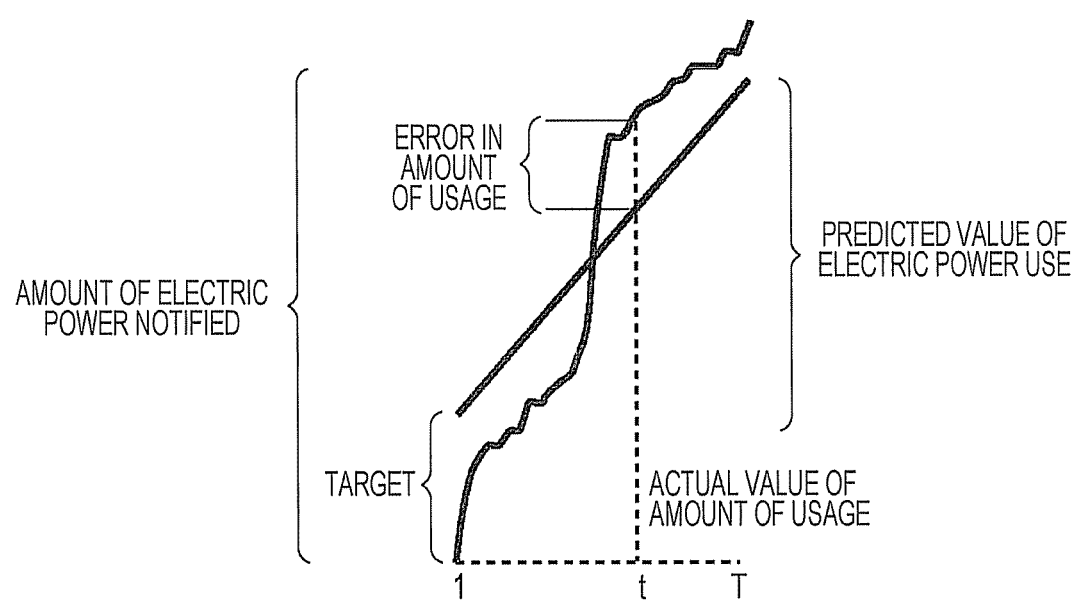
FIG. 6 illustrates a relationship among an electric power amount notified, a target, and a predicted value of electric power usage.

FIG. 6 illustrates a relationship among an amount of electric power use notified, an electric power usage amount error, an actual value of the amount of electric power usage, and a predicted value of electric power usage.

The definition of the MDP is described in detail below.

For one embodiment of the present invention, a section has a length of 30 minutes and is divided into subsections {1, 2, ..., T=10} each having a length of 3 minutes. The amount of electric power usage in the next section is notified before 15 minutes (subsection $T_{trgt}$=5). At the starting point in each subsection t, the charging and discharging amount in the subsection t is decided. It is assumed that the efficiency of a storage battery is 100%.

Figure 7:
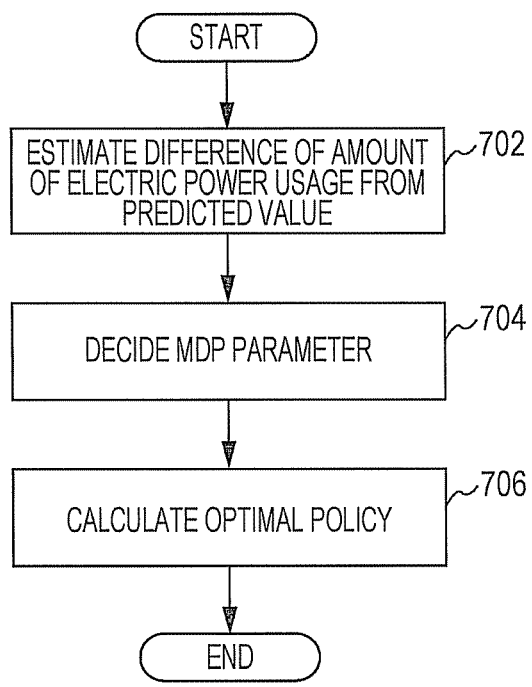
FIG. 7 is a schematic flow chart of processing for generating an optimal policy in accordance with the present invention.

Referring to FIG. 7, the processing by the optimal policy generating module 410 is described in detail. This processing is made up of, as general steps, processing of estimating the difference of the amount of electric power usage from a predicted value in step 702, processing of deciding an MDP parameter in step 704, and processing of calculating an optimal policy in step 706.

The processing in step 702 is processing of preparing the prediction error distribution 411 and generates a model for deciding a probability at which, when the error in the amount of usage in a subsection t is x, the error in the amount of usage in the next subsection t+1 is y. Here, the value is based on the premise that no storage battery is used.

For example, when there is a history of the amount of electric power usage for each 30 minutes, the probability distribution of $X_1 \ldots X_T$ such that $X_1 + \ldots + X_T$ approximately has the probability distribution F from the prediction error distribution F for the amount of electric power usage for each 30 minutes.

Figure 8:
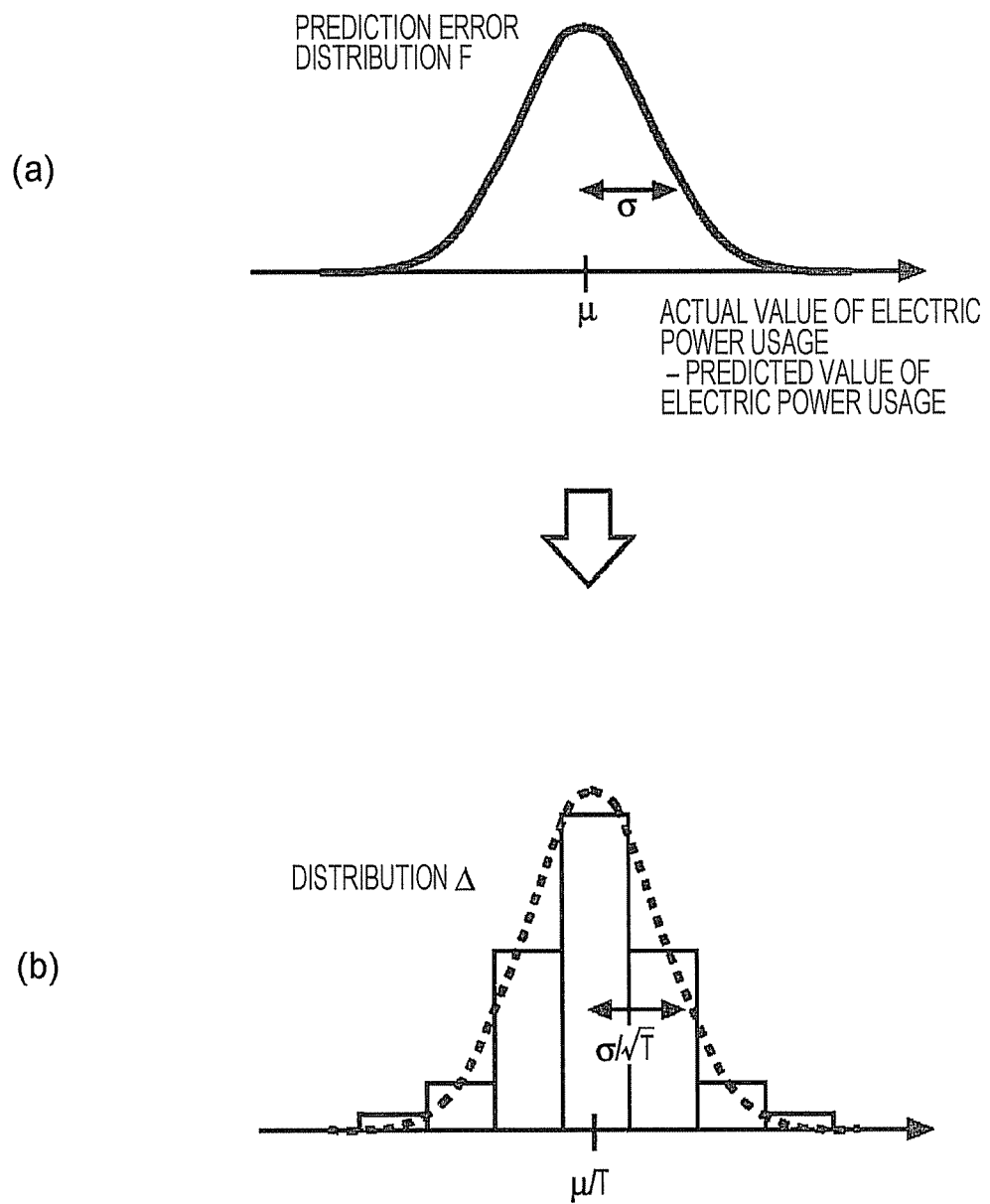
FIG. 8 illustrates prediction error distributions of an electric power usage amount.

To this end, for example, F illustrated in FIG. 8(a) is approximated by the normal distribution $N(\mu, \sigma^2)$ such that each $X_1$ is in a distribution in which $N(\mu/T, \sigma^2/T)$ is discretized in a finite section. Hereinafter, $X_1, \ldots, X_T$ have the independent and identical distribution A, and the value $x_j$ is taken at the probability $p_j$ (j=1, ..., T).

The condition that $X_1, \ldots, X_T$ have the independent and identical distribution A is not essential. Alternatively, they may have correlated, as in an autoregressive model.

If the distribution of the prediction error $X_i$ for each subsection cannot be approximated by a normal distribution, it is assumed that the prediction error $X_i$ for each subsection can be estimated.

As a premise for describing step 704, the definitions of the MDP used in the present embodiment are provided.

A state is defined using a set of four values as s=(x,b,t,trgt).
x: electric power usage amount error
b: amount of charge
t: subsection
trgt: target in the next section (trgt=null for $t \leq T_{trgt}$)

Possible action $a=(a_1, a_2)$ in the state s=(x,b,t,trgt) is as follows:
for $t=T_{trgt}$, deciding the charging and discharging amount $a_1$ in the subsection t and the target $a_2$ in the next section; and
for $t \neq T_{trgt}$, deciding the charging and discharging amount $a_1$ in the subsection t ($a_2$=null)
where a possible value of $a_1$ depends on the amount of charge.

Candidates for the value of $a_1$ are {−1,0,1}, and candidates for the value of $a_2$ are {−5, −4, ..., 4, 5}

Transition when the action $a=(a_1,a_2)$ is taken in the state s=(x,b,t,trgt) is as follows:
for t<T, $t \neq T_{trgt}$, the transition probability to the state s'=(x+$a_1$+$x_j$,b+$a_1$,t+1,trgt) is $p_j$ (j=1, ..., n);
for $t=T_{trgt}$, the transition probability to the state s'=(x+$a_1$+$x_j$,b+$a_1$,t+1,$a_2$) is $p_j$(j=1, ..., n);
for t=T, the transition probability to the state s'=(−trgt,b+$a_1$,1,null) is 1.

Figure 9:
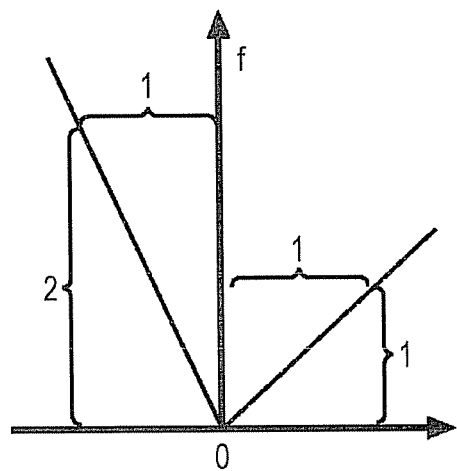
FIG. 9 illustrates an example of an electric power cost function.
Figure 10:
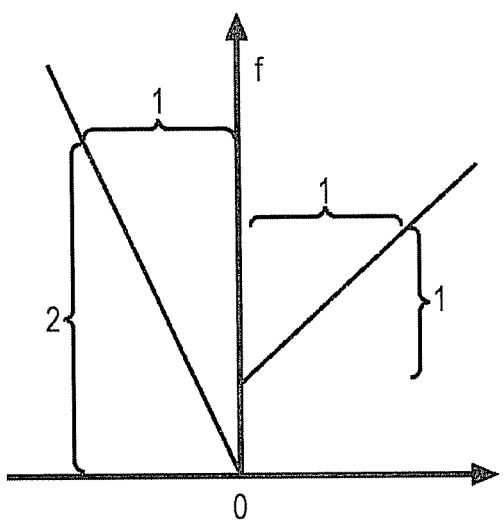
FIG. 10 illustrates an example of an electric power cost function.

The cost occurs only in transition from the state for t=T.
The expected cost occurring when the action $a=(a_1,\text{null})$ is taken is specified by the following expression:

$$\sum_j p_j f(x + a_1 + x_j) \quad \text{[Expression 1]}$$

where f is a function illustrated in FIG. 9. If the cost occurs intermittently when electric power is surplus, the cost may not be zero but a positive value at the origin point, as illustrated in FIG. 10. The cost of electric power is typically represented by such a piecewise linear function. It is to be understood that the present invention can support a cost structure in any function form.

Next, the processing of deciding an MDP parameter by the MDP optimization routine 414 is described with reference to the flow charts in FIGS. 11 and 12.

Figure 11:
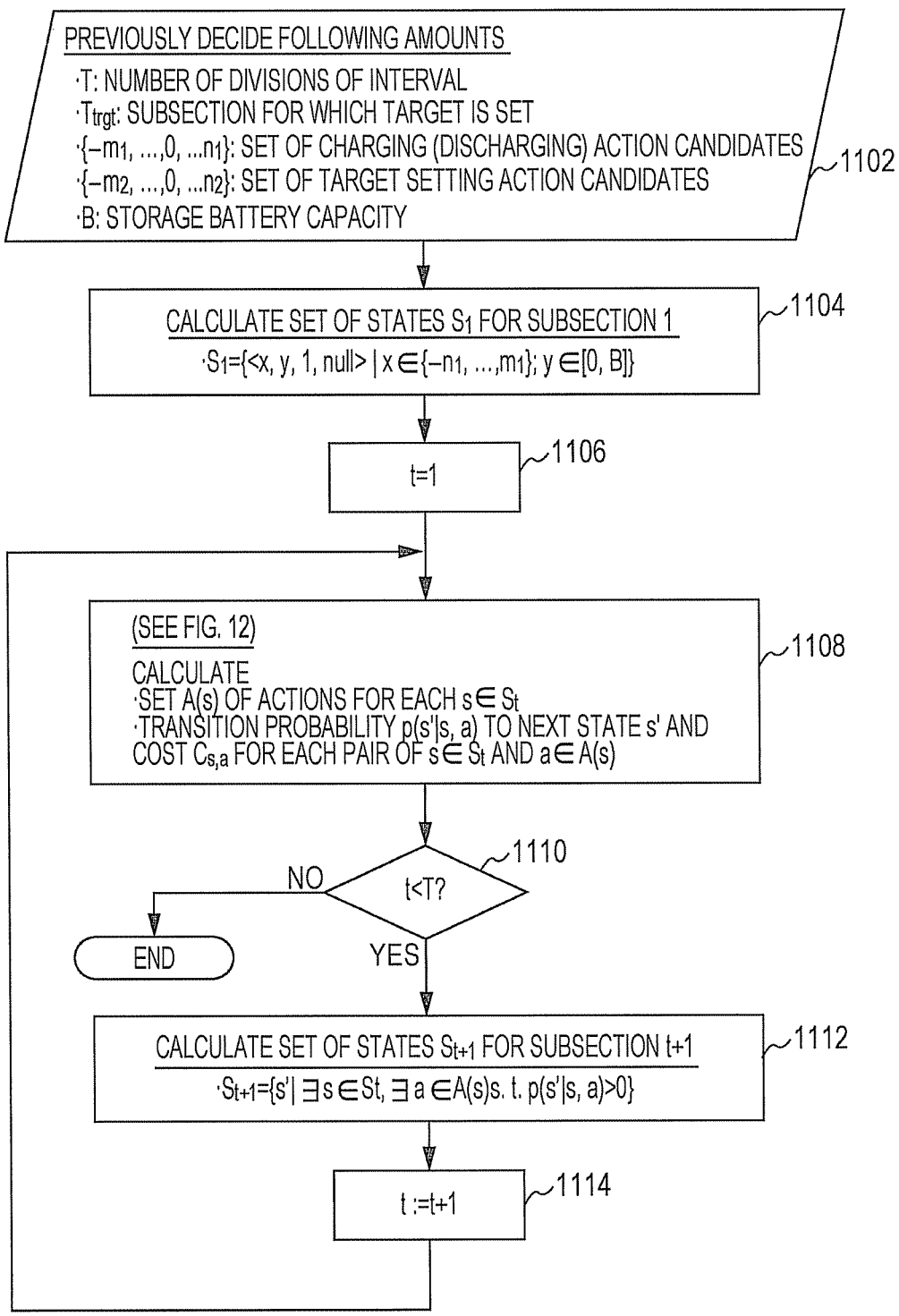
FIG. 11 is a flow chart of processing of calculating a parameter in a Markov decision process (MDP).
Figure 12:
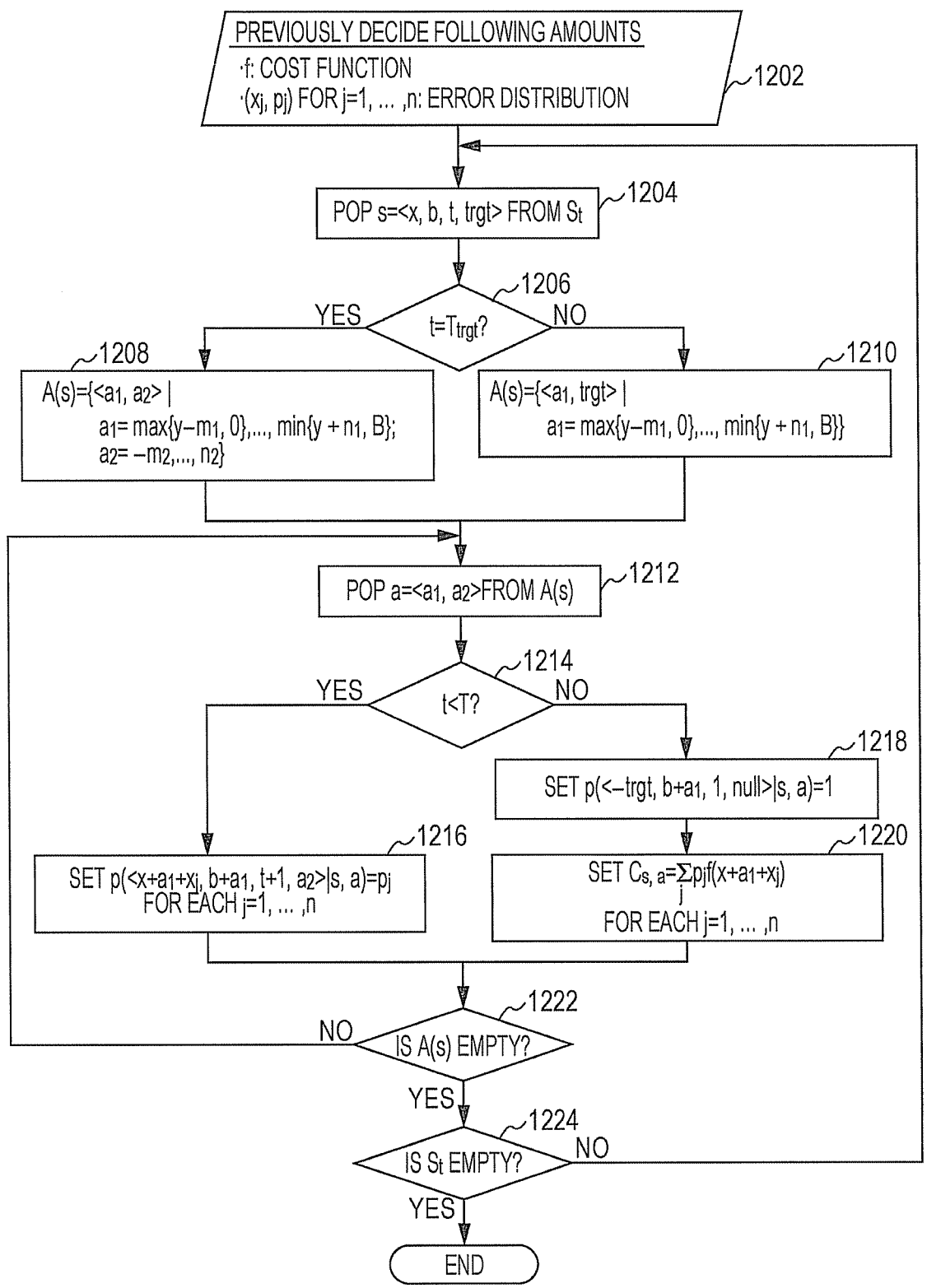
FIG. 12 is a flow chart of processing of calculating a parameter in the MDP.

In FIG. 11, in step 1102, the MDP optimization routine 414 reads the previously decided amounts described below.
T: the number of divisions of an interval
$T_{trgt}$: subsection for which a target is set
{$-m_1, \ldots, 0, \ldots, n_1$}: a set of charging (discharging) action candidates
{$-m_2, \ldots, 0, \ldots, n_2$}: a set of target setting action candidates
B: storage battery capacity In step 1104, the MDP optimization routine 414 calculates the set of states $s_1$ in the subsection 1 using the following expression:

$S_1 = \{<x,y,1,\text{null}> | x \in \{-n_1, \ldots, m_1\}; y \in [0,B]\}$

In step 1106, the MDP optimization routine 414 sets the variable t at 1, which is the number of the subsection.

In step 1108, the MDP optimization routine 414 calculates the set of actions A(s) for each $s \in S_t$ and calculates the transition probability p(s'|s,a) to the next state s' and the cost $C_{s,a}$ for each pair of $s \in S_t$ and $a \in A(s)$.

The details of step 1108 are described below with reference to the flow chart in FIG. 12.

In step 1110, the MDP optimization routine 414 determines whether t<T, that is, the subsection ends.

If t<T, in step 1112, the MDP optimization routine 414 calculates the set of states $S_{t+1}$ in the subsection t+1 using the following expression:

$S_{t+1} = \{s' | \exists s \in St, \exists a \in A(s) \text{ s.t. } p(s'|s,a) > 0\}$ where s.t. stands for such that and means when the following constraint is satisfied.

After step 1112, in step 1114, t is incremented by one, and the processing returns to step 1108.

With reference back to step 1110, if t<T is false, that is, t=T, the processing is completed.

Next, the processing in step 1108 is described in detail with reference to the flow chart in FIG. 12. In FIG. 12, in step 1202, the MDP optimization routine 414 decides the cost function f and the error distribution $(x_j, p_j)$ for j=1, . . . , n. The cost function f is decided by the electric power cost structure 413, and the error distribution $(x_j, p_j)$ is decided by the prediction error distribution 411.

In step 1204, the MDP optimization routine 414 pops s=<x, b,t,trgt> from $S_t$.

In step 1206, the MDP optimization routine 414 determines whether $t=T_{trgt}$. If so, in step 1208, the MDP optimization routine 414 decides A(s) by A(s)={<$a_1$, $a_2$>|$a_1$=max{y-$m_1$,0}, . . . , min{y+$n_1$,B}; $a_2$=-$m_2$, . . . , $n_2$}

If t is not $T_{trgt}$, in step 1210, the MDP optimization routine 414 decides A(s) by A(s)={<$a_1$,trgt>|$a_1$=max{y-$m_1$,0}, . . . , min{y+$n_1$,B}}

The processing proceeds from step 1208 or step 1210 to step 1212, where the MDP optimization routine 414 pops a=<$a_1$,$a_2$> from A(s).

In the next step 1214, the MDP optimization routine 414 determines whether t<T, that is, the subsection ends. If t<T, the processing proceeds to step 1216, where the MDP optimization routine 414 sets p(<x+$a_1$+$x_j$,b+$a_1$,t+1,$a_2$>|s,a)=$p_j$ for each j=1, . . . , n.

If t<T is not satisfied, the MDP optimization routine 414 sets p(<-trgt,b+$a_1$,1,null>|s,a)=1 in step 1218 and sets the following expression for each j=1, . . . , n, in step 1220.

$$C_{s,a} = \sum_j p_j f(x|a_1|x_j)$$ [Expression 2]

The processing proceeds from step 1216 or step 1220 to step 1222, where the MDP optimization routine 414 determines whether A(s) is empty. If A(s) is not empty, the processing returns to step 1212.

If A(s) is empty, the processing proceeds to step 1224, where the MDP optimization routine 414 determines whether $S_t$ is empty. If $S_t$ is not empty, the processing returns to step 1202. In contrast, if $S_t$ is empty, the processing illustrated in the flow chart in FIG. 12 is completed and returns to step 1108 in FIG. 11.

In the end, when the processing in FIG. 11 is completed, the correspondence between states and optimal policies provided below is obtainable.

TABLE 1

| State <x,b,t,trgt> | Optimal Policy <$a_1$,$a_2$> |
|---|---|
| <0,0,1,null> | <0,null> |
| <0,0,2,null> | <1,null> |
| . . . | . . . |

This content may preferably be retained in the hard disk drive 308 such that it is allowed to be searched by computer processing afterward.

In that way, step 704 in FIG. 7 is completed. Next, the processing of calculating an optimal policy using transition probability p(s'|s,a) to each state and cost $C_{s,a}$ in step 706 is described.

An optimal policy may preferably be calculated using the solver 415. As the solver 415, an existing solver, for example, but not limited to, IBM® ILOG CPLEX, jMDP (http://copa.uniandes.edu.co/software/jmarkov/) may be used.

To find an optimal policy in the MDP, a technique, such as linear programming, value iteration, and policy iteration, may be used.

For optimization using linear programming in the MDP, refer to references, such as M. L. Puterman, Markov Decision Processes: Discrete Stochastic Dynamic Programming, Wiley-Interscience, 2005, Section 6.9; D. Bello and G Riano, "Linear programming solvers for Markov decision processes," in Proc. of the WEE Systems and Information Engineering Design Symposium, 2006, pp. 90-95; or http://www.sys.virginia.edu/sieds06/papers/FMorning-Session5.1.pdf.

One embodiment of an MDP optimal policy in step 706 is solving the linear programming problem described below using IBM® ILOG CPLEX, where S is a set of states, A(s) is a set of action candidates from a state s, $C_{s,a}$ is an expected cost when an action a is taken in the state s, and p(s'|s,a) is a probability that the state transitions to a state s' when the action a is taken in the state s.

$$\min \cdot \sum_{s \in S} \sum_{a \in A(s)} c_{s,a} x_{s,a}$$ [Expression 3]

$$\text{s.t.} \sum_{a \in A(s')} x_{s',a} - \sum_{s \in S} \sum_{a \in A(s)} p(s' | s, a) x_{s,a} = 0,$$

$$\forall s' \in S$$

$$x_{s,a} \geq 0, \forall a \in A(s), \forall s \in S$$

Another embodiment of an MDP optimal policy in step 706 is solving the linear programming problem described below using IBM® ILOG CPLEX, where S is a set of states, A(s) is a set of action candidates from a state s, $C_{s,a}$ is an expected cost when an action a is taken in the state s, p(s'|s,a) is a probability that the state transitions to a state s' when the action a is taken in the state s, $\alpha_s$ is a probability that the initial state is the state s, and γ is a discount rate in one subsection. An example of the value of γ may be 0.99.

$$\min \cdot \sum_{s \in S} \sum_{a \in A(s)} c_{s,a} x_{s,a}$$ [Expression 4]

$$\text{s.t.} \sum_{a \in A(s')} x_{s',a} - \gamma \sum_{s \in S} \sum_{a \in A(s)} p(s' | s, a) x_{s,a} = \alpha_{s'},$$

$$\forall s' \in S$$

$$x_{s,a} \geq 0, \forall a \in A(s), \forall s \in S$$

Value iteration and policy iteration may be solved by the jMDP above, for example.

Value iteration may be solved by the following algorithm:

Step 1: Initialize a value by the following expression:

$$\text{Set } v(s) := 0, \forall s \in S$$ [Expression 5]

Here, the value may be nonzero.

Step 2: Sequentially calculate the following expression for n=0, 1, . . . :

$$v(s) := \min_{a \in A(s)} \left\{ c_{s,a} + \sum_{s' \in S} \gamma p(s' | s, a) v(s') \right\}, \forall s \in S \quad \text{[Expression 6]}$$

When an ending condition is satisfied, for example, when the difference from the previous v is sufficiently small, or when a time limit has passed, the algorithm is completed.

Step 3: Then, obtain d(s) represented by the following expression as an optimal action in s.

$$d(s) := \operatorname*{argmin}_{a \in A(s)} \left\{ c_{s,a} + \sum_{s' \in S} \gamma p(s' | s, a) v(s') \right\}, \quad \text{[Expression 7]}$$

$$\forall s \in S$$

Policy iteration may be solved by the following algorithm.
Step 1: Initialize an action by the following expression:

Let $d(s)$ be an arbitrary element of $A(s), \forall s \in S$. [Expression 8]

Step 2: Solve the following expression for v:

$$(1-\gamma P_d)v = r_d \quad \text{[Expression 9]}$$

Because this expression is a simultaneous linear equation, it can be solved by a normal way described below.

$$v = (I - \gamma P_d)^{-1} r_d \quad \text{[Expression 10]}$$

where rd is a column vector, the s-th component is cs,d(s), Pd is a square matrix, and the (s',s)-th component is p(s'|s,d(s)).

Step 3: Calculate d(s) by the following expression:

$$d(s) := \operatorname*{argmin}_{a \in A(s)} \left\{ c_{s,a} + \sum_{s' \in S} \gamma p(s' | s, a) v(s') \right\}, \quad \text{[Expression 11]}$$

$$\forall s \in S$$

where v(s') is the s'-th component of v calculated in step 2.
Step 4: Return to step 2.

When an ending condition is satisfied, the algorithm is completed. At this time, because d is not updated in finite times, typically, the algorithm ends at that point.

The optimal action calculated in this way may preferably be retained in the hard disk drive 308 as the optimal policy 421.

Figure 13:
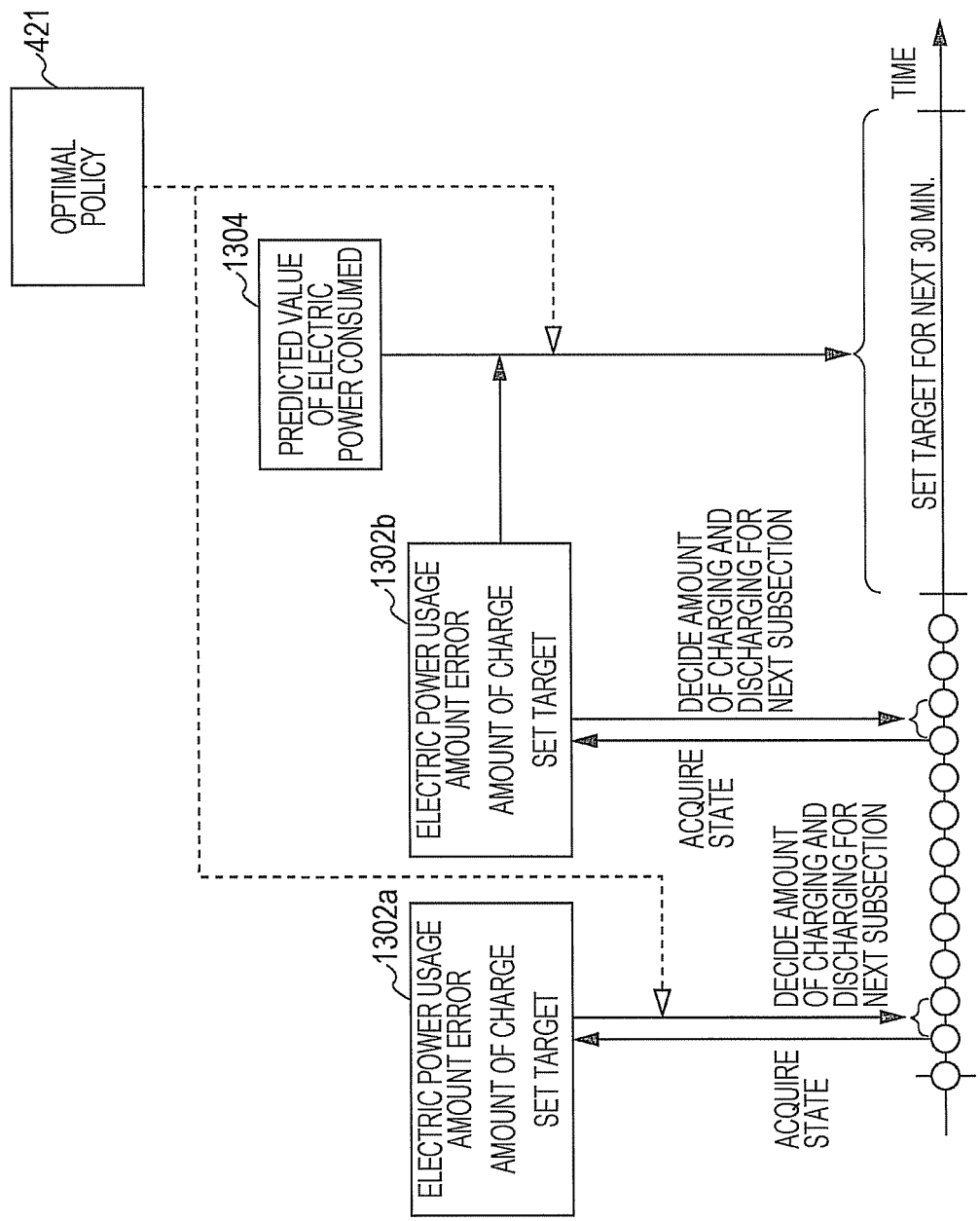
FIG. 13 is a diagram that illustrates processing of deciding a charging and discharging amount in a subsection according to an optimal policy.

Next, the processing of executing an optimal policy using the optimal policy 421 generated in this way is described. FIG. 13 illustrates how the optimal policy 421 is used by the electric power managing routine 422. That is, the electric power managing routine 422 acquires a state, that is, electric power usage amount error, amount of charge, and set target 1302a at the starting point of each subsection, refers to the optimal policy 421, and decides the charging and discharging amount in that subsection. In a subsection within a section (t=$T_{trgt}$), the electric power managing routine 422 acquires a state 1302b and a predicted value 1304 of electric power consumed, refers to the optimal policy 421, and also sets a target for the next 30 minutes.

Figure 14:
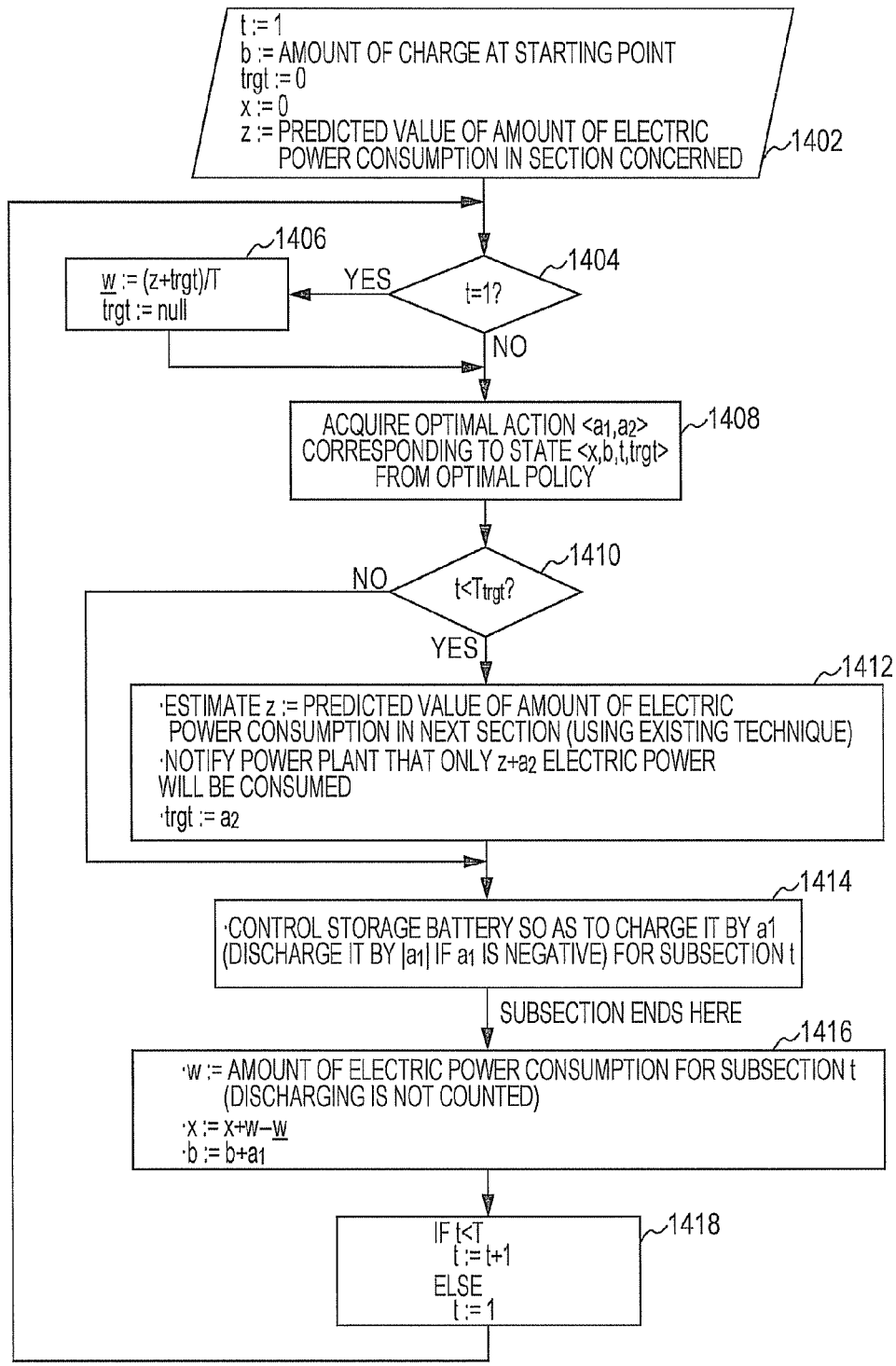
FIG. 14 is a flow chart of processing of deciding an optimal action in a subsection according to an optimal policy.

Next, the processing by the electric power managing routine 422 is described with reference to the flow chart in FIG. 14. In step 1402, the electric power managing routine 422 performs initial settings described below.
t:=1
b:=the amount of charge at the starting point
trgt:=0
x:=0
z:=a predicted value of the amount of electric power consumption in the section concerned In step 1404, the electric power managing routine 422 determines whether t=1, that is, the current subsection is the initial subsection. If so, in step 1406, the electric power managing routine 422 performs the initial settings w:=(z+trgt)/T, trgt:=null. Here, w denotes the amount of a rough indication in which approximate electric power will be used in each subsection.

In step 1408, the electric power managing routine 422 acquires the optimal action <$a_1,a_2$> corresponding to the state <x,b,t,trgt> from the optimal policy 421.

Figure 15:
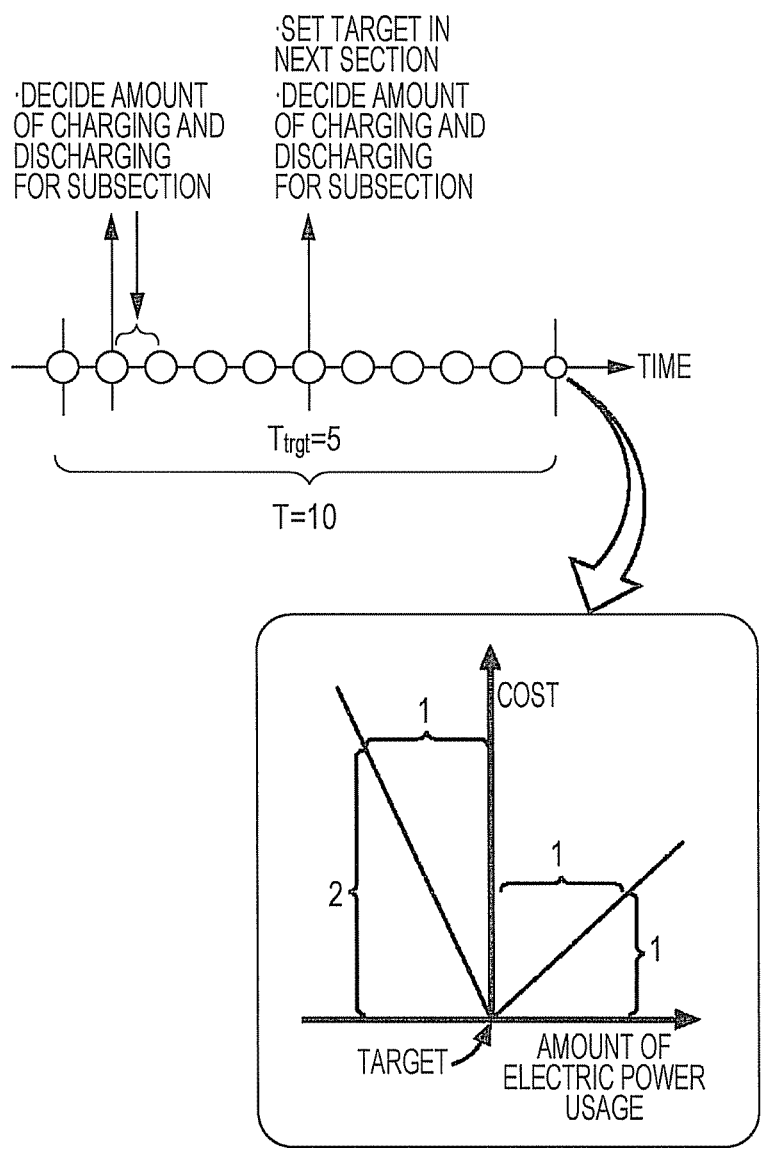
FIG. 15 is a diagram that illustrates processing of deciding a charging and discharging amount in a subsection and setting a target in the next section.

In step 1410, the electric power managing routine 422 determines whether t=$T_{trgt}$. If so, the following processing is performed in step 1412.
z:=a predicted value of the amount of electric power consumption in the next section (predicted using an existing technique)
Notify the power plant that only z+$a_2$ will be consumed
trgt:=$a_2$ Note that, as illustrated in FIG. 15, a subsection at which t=$T_v$ within a section is a special subsection in that, in that subsection, a target for the next section is set. t=$T_{trgt}$ is decided on the basis of a time limit of notification of electric power usage under an agreement reached between the electric power company and the steel mill.

Then, in step 1414, the electric power managing routine 422 controls the storage battery so as to charge it by $a_1$ (discharge it by |$a_1$| if $a_1$ is negative) for the subsection t.

Then, in step 1416, the electric power managing routine 422 performs the following processing.
w:=the amount of electric power consumption for the subsection t (discharging is not counted)
x:=x+w−w
b:=b+$a_1$ Then, in step 1418, the electric power managing routine 422 increments t by one for t<T and resets t to one for t≥_. T. The processing returns to step 1404.

Figure 16:
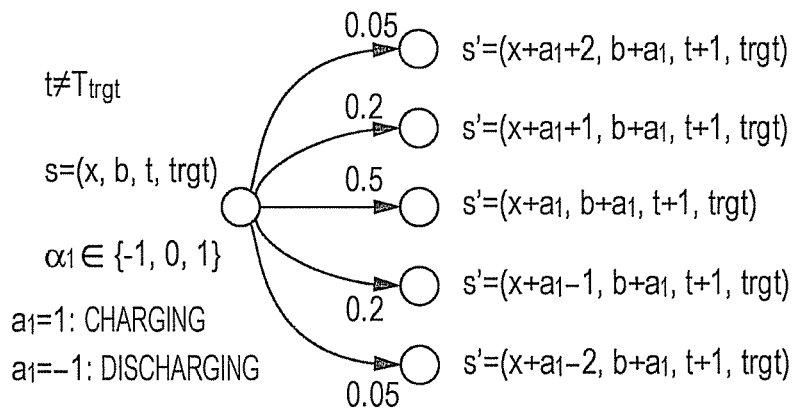
FIG. 16 illustrates an example of a state transition occurring when t is not $T_{trgt}$.

FIG. 16 illustrates an example of a state transition when t is neither $T_{trgt}$ nor T. That is, the target trgt is provided, and the charging and discharging amount is decided as an action.

Figure 17:
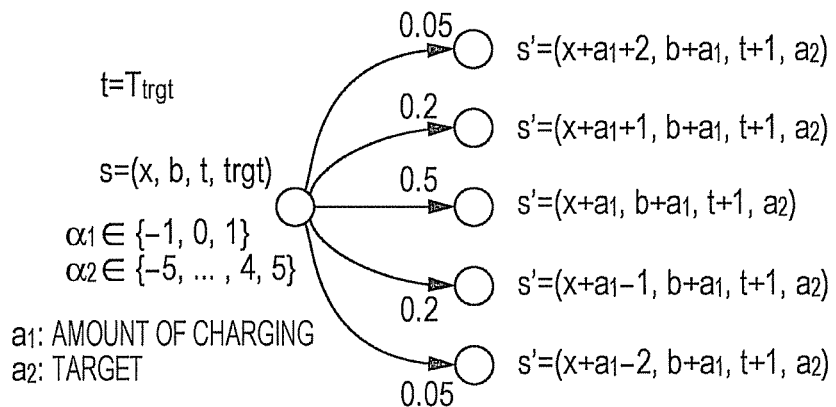
FIG. 17 illustrates an example of a state transition occurring when t is $T_{trgt}$.

FIG. 17 illustrates an example of a state transition when t=$T_{trgt}$. In this case, both the charging and discharging amount and the target trgt are decided.

In the present embodiment, for the sake of convenience of description, charging characteristics and discharging characteristics are considered to be symmetrical. In reality, though, they are asymmetric, so a parameter varies depending on the actual characteristics.

Specific embodiments of the present invention are described above about cost adjustment of electric power. It is to be understood that the present invention is not limited to the above embodiments and is also applicable to cost rationalization of a resource that has a specific cost structure and whose storing and releasing can be controlled, such as gas and water.

The invention claimed is:
1. A computer implemented method for generating a policy for optimizing a cost of a resource under a predetermined cost structure, the method comprising:
storing, in a computer-readable medium, an error distribution that indicates a deviation of an amount of usage from a predicted value referred to as usage amount error, a characteristic of a storage battery configured to store or release the resource, wherein the characteristic includes an amount of the resource in the storage battery, and the cost structure;

calculating, using a computer processor processing a Markov decision process, an expected cost and a parameter that includes a transition probability on the basis of the error distribution, the characteristic of the storage battery, and the cost structure, the Markov decision process including a state defined by at least the usage amount error, the amount of the resource in the storage battery, a specification of a subsection within a section of usage interval, and a set target for a next section; and deciding, using the computer processor, and implementing an optimal policy for the next section that includes an action of storing or releasing the resource in the storage battery for the state of the Markov decision process using the expected cost in the Markov decision process and the parameter including the transition probability, wherein the resource comprises electric power.

2. The method according to claim 1, wherein the cost structure comprises a piecewise linear function.

3. The method according to claim 1, wherein said deciding an optimal policy includes solving using linear programming.

4. The method according to claim 1, wherein said deciding an optimal policy includes solving using value iteration.

5. The method according to claim 1, wherein said deciding an optimal policy includes solving using policy iteration.

6. A computer program product for generating a policy for optimizing a cost of a resource under a predetermined cost structure, the program product comprising a computer-readable storage medium having program code embodied therewith, the program code being executable by a processor to perform a method comprising:

a step of storing an error distribution that indicates a deviation of an amount of usage from a predicted value referred to as usage amount error, a characteristic of a storage battery configured to store or release the resource the resource, wherein the characteristic includes an amount of the resource in the storage battery, and the cost structure in a computer-readable form;

a step of calculating, using a Markov decision process, an expected cost and a parameter that includes a transition probability on the basis of the error distribution, the characteristic of the storage battery, and the cost structure, the Markov decision process including a state defined by at least the usage amount error, the amount of resource in the storage battery, a specification of a subsection within a section of usage interval, and a set target for a next section; and a step of deciding an optimal policy for implementation, the optimal policy includes an action of storing or releasing the resource in the storage battery for the state of the Markov decision process using the expected cost in the Markov decision process and the parameter including the transition probability, wherein the resource comprises electric power.

7. The program product according to claim 6, wherein the cost structure comprises a piecewise linear function.

8. The program product according to claim 6, wherein the step of deciding the optimal policy is solved using linear programming.

9. The program product according to claim 6, wherein the step of deciding the optimal policy is solved using value iteration.

10. The program product according to claim 6, wherein the step of deciding the optimal policy is solved using policy iteration.

* * * * *